United States Patent

Kielhorn-Bayer et al.

(10) Patent No.: US 6,524,427 B2
(45) Date of Patent: *Feb. 25, 2003

(54) METAL SALT CROSSLINKED ADHESIVES

(75) Inventors: Sabine Kielhorn-Bayer, Maxdorf (DE); Burkhardt Dames, Ludwigshafen (DE); Karl-Heinz Schumacher, Neustadt (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,631

(22) Filed: Aug. 25, 1999

(65) Prior Publication Data

US 2001/0041764 A1 Nov. 15, 2001

(30) Foreign Application Priority Data

Aug. 26, 1998 (DE) .......................... 198 38 668

(51) Int. Cl.⁷ ............................................ C09J 101/00
(52) U.S. Cl. ..................... 156/327; 524/556; 526/317.1
(58) Field of Search ................. 524/432, 433, 524/436, 556, 832; 525/367, 371; 526/317.1; 156/327

(56) References Cited

U.S. PATENT DOCUMENTS 3,264,272 A * 8/1966 Rees .......................... 156/332
5,149,745 A * 9/1992 Owens et al. ................ 525/366
5,270,376 A * 12/1993 Matejcek et al. ............ 524/501
5,300,359 A    4/1994 Matejcek et al.
5,623,014 A    4/1997 Bauer et al.
5,656,685 A * 8/1997 Satgurunathan et al. .... 524/460
5,942,329 A * 8/1999 Nakayama et al. ......... 526/317.1

FOREIGN PATENT DOCUMENTS

| DE | 1051436 A | * | 2/1959 |
| DE | 1 051 436 | | 2/1959 |
| DE | 196 49 383 | | 6/1998 |
| EP | 0 442 370 | | 8/1991 |
| EP | 0 373 918 | | 8/1996 |
| EP | 0 644 902 | | 12/1996 |
| GB | 749801 A | * | 5/1956 |

OTHER PUBLICATIONS

Abstract to JP73024490B (Matsutani Kagaku Kogyo Co.), 1973.*

* cited by examiner

Primary Examiner—John J. Gallagher
(74) Attorney, Agent, or Firm—Oblon, Spivak, McClelland, Maier & Neustadt, P.C.

(57) ABSTRACT

Adhesives comprising as binder an aqueous dispersion of a polymer formed from free-radically polymerizable compounds (monomers), wherein from 0.1 to 20% by weight of the monomers, based on the overall amount of the monomers, are ethylenically unsaturated acids at least 20 mol % of whose acid groups are present as a salt of at least divalent metals.

25 Claims, No Drawings

METAL SALT CROSSLINKED ADHESIVES

The invention relates to adhesives comprising as binder an aqueous dispersion of a polymer formed from free-radically polymerizable compounds (monomers), wherein from 0.1 to 20% by weight of the monomers, based on the overall amount of the monomers, are ethylenically unsaturated acids at least 20 mol % of whose acid groups are present as a salt of at least divalent metals.

The invention relates in particular to the use of said adhesives in gloss film lamination.

The use of aqueous dispersions of crosslinkable polymers as adhesives, or as binders in adhesives, is known. EP A 644 902 describes aqueous polymer dispersions of this kind which comprise hydroxylamines or oxime ethers as crosslinkers. The polymers crosslink with the hydroxylamines or oxime ethers at room temperature following removal of the dispersion water.

The above crosslinking systems require a specific polymer structure: in particular, monomers with carbonyl groups are necessary for the crosslinking reaction.

There is a general desire for alternative crosslinking systems comprising simple and readily available monomers and crosslinkers. The new crosslinking systems of this kind would have to meet a series of requirements. In particular, aqueous polymer dispersions already containing the crosslinker would have to be stable on storage so that one-component systems were possible (with the crosslinker not added until shortly before subsequent application). The crosslinking reaction should take place without an increase in temperature.

Adhesives are required to have good sticking properties and, in particular, very good adhesion and cohesion. In the context of their use in gloss film lamination, important factors are good adhesion to the substrates (transparent polymer films and paper or card) and high elasticity of the resultant laminates.

When the film composites are intended to be partially transparent, the adhesives must also be free from fine coagulum and must be aging resistant, light stable and low-foaming.

Processing in the laminating units imposes the requirements of high shear stability and good flow properties.

In particular, there is a desire for a high level of immediate strength in the composites produced. Such immediate strength (peel strength measured directly following the production of the composite) offers the advantage that the film composite can quickly be processed further. This further processing may, for example, be in the form of further operations on the laminate (cutting, punching, folding, sealing).

Aqueous polymer dispersions which comprise carboxylates of divalent metals are already known, for example, from EP 442 370 and DE 1051436.

It is an object of the present invention to provide adhesives which are based on crosslinkable polymers and meet the above requirements.

We have found that this object is achieved by the adhesives defined at the outset and by their use in gloss film lamination.

The adhesives of the invention preferably comprise a polymer composed of a) from 20 to 99.9% by weight, preferably from 60 to 99.5% by weight and, with particular preference, from 80 to 99.5% by weight of at least one principal monomer b) from 0.1 to 20% by weight, preferably from 0.5 to 10% by weight and, with particular preference, from 0.5 to 5% by weight of an ethylenically unsaturated acid at least 20 mol % of whose acid groups are present in the form of a salt of at least divalent metals c) from 0 to 70% by weight, preferably from 0 to 35% by weight and, with particular preference, from 0 to 15% by weight of further monomers (monomers c).

Principal monomers a) are selected from $C_1$–$C_{20}$-alkyl (meth)acrylates, vinyl esters of carboxylic acids having up to 20 carbon atoms, vinylaromatic compounds having up to 20 carbon atoms, ethylenically unsaturated nitriles, vinyl halides, vinyl ethers of $C_1$–$C_{10}$ alcohols, aliphatic hydrocarbons with 2 to 8 carbon atoms and 1 or 2 double bonds, or mixtures of these monomers.

Examples are $C_1$–$C_{10}$ -alkyl (meth)acrylates, such as methyl methacrylate, methyl acrylate, n-butyl acrylate, ethyl acrylate and 2 ethylhexyl acrylate.

Mixtures of the alkyl (meth)acrylates are also suitable in particular.

Examples of vinyl esters of carboxylic acids with 1 to 20 carbon atoms are vinyl laurate, stearate, propionate, acetate, and Versatic acid vinyl ester.

Suitable vinylaromatic compounds are vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers are vinyl methyl ether and vinyl isobutyl ether. Preference is given to vinyl ethers of $C_1$–$C_4$ alcohols.

As hydrocarbons having 2 to 8 carbon atoms and two olefinic double bonds mention may be made of butadiene, isoprene and chloroprene.

Suitable monomers a) are preferably $C_1$–$C_{10}$ -alkyl acrylates and methacrylates, especially $C_1$–$C_8$-alkyl acrylates and methacrylates, with particular preference being given in each case to the acrylates.

Very particular preference is given to methyl acrylate, ethyl acrylate, n-butyl acrylate, n-hexyl acrylate, octyl acrylate and 2-ethylhexyl acrylate, and to mixtures of these monomers, as monomers a).

With particular preference, the polymer contains at least 5% by weight, preferably at least 15% by weight, of methyl or ethyl acrylate and at least 5% by weight, preferably at least 15% by weight, of n-butyl acrylate. The amounts by weight are based on the polymer.

Monomers b) comprise, for example, monomers having carboxylic acid, sulfonic acid or phosphonic acid groups. Carboxylic acid groups are preferred. Examples that may be mentioned are acrylic, methacrylic, itaconic, maleic and fumaric acid.

Examples of further monomers, c), are hydroxyl-containing monomers, especially $C_1$–$C_{10}$-hydroxyalkyl (meth)acrylates, and also (meth)acrylamide.

Phenyloxyethyl glycol monomer (meth)acrylate, glycidyl acrylate, glycidyl methacrylate, and amino (meth)acrylates such as 2 aminoethyl (meth)acrylate may additionally be mentioned as further monomers c).

Monomers c) which in addition to the double bond carry further functional groups, such as isocyanate, amino, hydroxyl, amido or glycidyl, may, for example, improve the adhesion to substrates.

Preferably, at least 40 mol %, with particular preference at least 70 mol % and, with very particular preference, 100 mol % of the acid groups of the acids b) are present in the form of a salt of at least divalent metals.

The metals are, for example, divalent or trivalent metals, preferably divalent metals, and especially Ca, Mg, Zn or Mn.

With particular preference the metal is Ca.

Converting the acid groups to the salts can be done by adding basic compounds of the metals, in particular by means of the hydroxyl compounds. A suitable example is $Ca(OH)_2$.

Converting the acid groups into the salt groups can be done even before the polymerization is conducted or else during or after the polymerization of the monomers.

Preferably, conversion to the salt groups takes place following polymerization, by adding the basic metal compounds to the resultant aqueous polymer dispersion.

The glass transition temperature of the polymer obtained from the monomers a) to c) is preferably below 60° C., in particular from −50 to +60° C., with particular preference from −30 to +40° C., and, with very particular preference, from −30 to +20° C.

The glass transition temperature of the polymer can be determined by customary methods, such as differential thermal analysis or differential scanning calorimetry (see e.g. ASTM 3418/82, midpoint temperature).

The polymer is prepared preferably by emulsion polymerization and in that case is an emulsion addition polymer.

Alternatively, preparation can take place by solution polymerization with subsequent dispersion in water.

In the case of emulsion polymerization, ionic and/or nonionic emulsifiers and/or protective colloids, or stabilizers, are used as surface-active compounds.

A detailed description of suitable protective colloids is given in Houben-Weyl, Methoden der organischen Chemie, Volume XIV/1, Makromolekulare Stoffe [macromolecular substances], Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of the protective colloids, are usually below 2000 g/mol. When mixtures of surface-active substances are used the individual components must of course be compatible with one another—in case of doubt, this can be checked with a few preliminary tests. It is preferred to use anionic and nonionic emulsifiers as surface-active substances. Common accompanying emulsifiers are, for example, ethoxylated fatty alcohols (EO units: 3 to 50, alkyl: $C_8$–$C_{36}$), ethoxylated mono-, di- and trialkylphenols (EO nits: 3 to 50, alkyl: $C_4$–$C_9$), alkali metal salts of dialkyl esters of sulfosuccinic acid, and also alkali metal salts and ammonium salts of alkyl sulfates (alkyl: $C_8$–$C_{12}$), of ethoxylated alkanols (EO units: 4 to 30, alkyl: $C_{12}$–$C_{18}$), of ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$).

Further suitable emulsifiers are compounds of the formula II

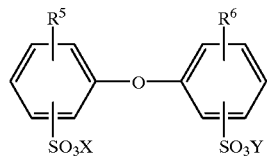

(II)

where $R^5$ and $R^6$ are hydrogen or $C_4$–$C_{14}$-alkyl but are not both hydrogen and C and Y can be alkali metal ions and/or ammonium ions. Preferably, $R^5$ and $R^6$ are linear or branched alkyl radicals of 6 to 18 carbon atoms or hydrogen and in particular have 6, 12 or 16 carbon atoms and are not both hydrogen. X and Y are preferably sodium, potassium or ammonium ions, particular preference being given to sodium. Particularly advantageous compounds II are those in which X and Y are sodium, $R^5$ is a branched alkyl radical of 12 carbon atoms, and $R^6$ is hydrogen or is the same as $R^5$. It is common to use technical-grade mixtures containing from 50 to 90% by weight of the monoalkylated product, an example being Dowfax® 2A1 (trademark of the Dow Chemical Company).

Other suitable emulsifiers are given in Houben-Weyl, op. cit., pages 192 to 208.

Tradenames of emulsifiers are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, Emulphor NPS 25.

The surface-active substance is normally used in amounts of from 0.1 to 10% by weight, based on the monomers to be polymerized.

Examples of water-soluble initiators for the emulsion polymerization are ammonium salts and alkali metal salts of peroxodisulfuric acid, such as sodium peroxodisulfate, hydrogen peroxide, or organic peroxides, such as tert-butyl hydroperoxide.

The reduction-oxidation (redox) initiator systems are particularly suitable.

The redox initiator systems consist of at least one reducing agent, which is usually inorganic, and an organic or inorganic oxidizing agent.

The oxidizing component comprises, for example, the abovementioned initiators for the emulsion polymerization.

The reducing component comprises, for example, alkali metal salts of sulfurous acid, such as sodium sulfite, sodium hydrogen sulfite, alkali metal salts of disulfurous acid, such as sodium disulfite, bisulfite adducts with aliphatic aldehydes and ketones, such as acetone bisulfite, or reducing agents such as hydroxymethanesulfinic acid and its salts, or ascorbic acid. The redox initiator systems can be used together with soluble metal compounds whose metallic component is able to occur in a plurality of valence states.

Examples of customary redox initiator systems are ascorbic acid/iron (II) sulfate/sodium peroxodisulfate, tert-butyl hydroperoxide/sodium disulfite, and tert-butyl hydroperoxide/sodium hydroxymethanesulfinate. The individual components, such as the reducing component for example, can also be mixtures; for example, a mixture of the sodium salt of hydroxymethanesulfinic acid, with sodium disulfite.

These compounds are usually employed in the form of aqueous solutions, with the lower concentration being determined by the amount of water that is acceptable in the dispersion and the upper concentration by the solubility of the compound in question in water. In general the concentration is from 0.1 to 30% by weight, preferably from 0.5 to 20% by weight and, with particular preference, from 1.0 to 10% by weight, based on the solution.

The amount of initiators is generally from 0.1 to 10% by weight, preferably from 0.5 to 5% by weight, based on the monomers to be polymerized. It is also possible to use a plurality of different initiators for the emulsion polymerization.

In the course of the polymerization it is possible to employ regulators in amounts, for example, of from 0 to 0.8 part by weight per 100 parts by weight of the monomers to be polymerized. Their function is to reduce the molecular mass. Suitable examples are compounds having a thiol group, such as tert-butyl mercaptan, ethylhexyl thioglycolate, mercaptoethanol, mercaptopropyltrimethoxysilane, or tert-dodecyl mercaptan. In the case of use as an adhesive for composite-film lamination, the proportion of said regulators can in particular be from 0.05 to 0.8 part by weight, preferably from 0.1 to 0.5 part by weight, per 100 parts by weight of the monomers to be polymerized. In the case of use as an adhesive for gloss film lamination, the use of a regulator is less preferred. The regulators contain no polymerizable ethylenically unsaturated group. They terminate the polymerization chain and are therefore attached in terminal position to the polymer chains.

The emulsion polymerization takes place generally at from 30 to 130° C., preferably from 50 to 90° C. The polymerization medium can consist either of water alone or of mixtures of water with water-miscible liquids such as methanol. Preferably, water alone is used. The emulsion polymerization can be conducted either as a batch process or in the form of a feed process, including a staged or gradient procedure. Preference is given to the feed process, in which a portion of the polymerization mixture is introduced as an initial charge, heated to the polymerization temperature and then partially polymerized, with the remainder of the polymerization mixture being supplied subsequently to the polymerization zone, usually by way of a plurality of spatially separate feed streams of which one or more comprise the monomers in pure or emulsified form, these feed streams being supplied continuously, in stages or under a concentration gradient, during which the polymerization is maintained. A seed polymer may also be included in the initial charge in order, for example, to achieve better regulation of particle size.

The manner in which the initiator is added to the polymerization vessel in the course of the free-radical aqueous emulsion polymerization is familiar to the person of average skill in the art. It can either be included entirely in the initial charge to the polymerization vessel or else can be added, continuously or in stages, at the rate at which it is consumed in the course of the free-radical aqueous emulsion polymerization. In each individual case this will depend on the chemical nature of the initiator system and on the polymerization temperature. Preferably, one portion is included in the initial charge and the remainder is supplied to the polymerization zone at the rate at which it is consumed.

In order to remove residual monomers it is common to add initiator even after the end of the actual emulsion polymerization, in other words after a monomer conversion of at least 95%.

In the case of the feed process the individual components can be added to the reactor from above, through the side or from below, through the reactor floor.

In the emulsion polymerization, aqueous dispersions of the polymer are obtained with solids contents of in general from 15 to 75% by weight, preferably from 40 to 75% by weight.

For a high space-time yield of the reactor, dispersions having a very high solids content are preferred. In order to be able to achieve solids contents>60% by weight a bimodal or polymodal particle size should be established, since otherwise the viscosity becomes too high and the dispersion can no longer be handled. A new particle generation can be produced, for example, by adding seed (EP 81083), excess amounts of emulsifier, or miniemulsions. A further advantage associated with the low viscosity at high solids content is the improved coating behavior at high solids contents. One or more new generations of particles can be produced at any desired point in time. This is guided by the target particle size distribution for a low viscosity.

The polymer is used in the form of its aqueous dispersion.

The dispersion is suitable as a laminating adhesive for bonding substrates of large surface area, in other words for producing laminates.

For use as a laminating adhesive the dispersion can comprise further customary additives, examples being wetting agents, thickeners, protective colloids, light stabilizers, and biocides.

The novel polymer or dispersion does not require the addition of tackifying resins (tackifiers) or plasticizers nor the addition of crosslinkers, other reactive components or co-components in order to achieve the desired properties when used as an adhesive.

In the case of use as a laminating adhesive, the dispersion of the invention is applied to the substrates of large surface area preferably in a layer thickness of from 0.1 to 20 and, with particular preference, from 2 to 7 $g/m^2$ by means, for example, of knife coating, brushing, etc.

After a short time for evaporation of the dispersion water (preferably after from 1 to 60 seconds) the coated substrate can then be laminated with a second substrate, it being possible for the temperature to be, for example, from 20 to 200° C., preferably from 20 to 70° C., and for the pressure to be, for example, from 1 to 30 $N/m^2$, preferably from 3 to 20 $N/m^2$.

Examples of suitable substrates are polymer films, especially those of polyethylene, oriented polypropylene, polyamide, polyethylene terephthalate, cellulose acetate, cellophane, polymer films (vapor-)coated with metal (e.g., aluminum) (metallized films for short) or else paper, card or metal foils, especially those of aluminum. Said foils and films can also be printed with printing inks, for example.

The polymer or the dispersion is preferably used as an adhesive for gloss film lamination.

In gloss film lamination, paper or card is bonded to transparent polymer films.

The aqueous dispersions have good sticking properties, and this extends in particular to gloss film lamination. In gloss film lamination a particularly important factor is good adhesion of the transparent polymer films to paper or card. The polymer film must adhere well even in the region of grooves and must not become detached from the paper or card. A further particular requirement, of course, is high gloss. All of these requirements are met in the case of the process of the invention and in the context of use in accordance with the invention.

EXAMPLES

A) Preparing Polymer Dispersions

Preparation is in Accordance with the Following General Procedure

The initial charge (250 g of water and 3 g of a styrene seed (33%) having an average particle diameter of 30 nm) was heated to an internal temperature of 85° C., and 5% of feedstream 2 was introduced. After a waiting time of 10 minutes, feedstreams 1 and 2 were started.

Feedstream 2 consisted of 3.0 g of sodium peroxodisulfate dissolved in 39.9 g of water. The composition of feedstream 1 is indicated in Tables 1–3.

Feedstreams 1 and 2 were metered in over 3 h, with post-polymerization for 0.5 h.

Prior to performance testing, the samples of the invention were neutralized with a 15% aqueous suspension of $Ca(OH)_2$ (20 g).

In the case of the comparative experiments, 25% aqueous NaOH (20 g) was used.

TABLE 1

Feedstream 1 (inventive dispersions)

| No. | $H_2O$ [g] | BA [g] | MA [g] | AA [g] | Dow (45%) [g] | IRA (50%) [g] | $Ca(OH)_2$ [g] |
|---|---|---|---|---|---|---|---|
| 1 | 537.8 | 780 | 200 | 20 | 8.9 | 12 | 20 |
| 2 | 537.8 | 730 | 250 | 20 | 8.9 | 12 | 20 |
| 3 | 537.8 | 680 | 300 | 20 | 8.9 | 12 | 20 |
| 4 | 537.8 | 630 | 350 | 20 | 8.9 | 12 | 20 |
| 5 | 537.8 | 580 | 400 | 20 | 8.9 | 12 | 20 |

TABLE 2

Feedstream 1 (comparative)

| No. | $H_2O$ [g] | BA [g] | MA [g] | AA [g] | Dow (45%) [g] | IRA (50%) [g] | NaOH (25%) [g] |
|---|---|---|---|---|---|---|---|
| 6 | 537.8 | 780 | 200 | 20 | 8.9 | 12 | 20 |
| 7 | 537.8 | 730 | 250 | 20 | 8.9 | 12 | 20 |
| 8 | 537.8 | 680 | 300 | 20 | 8.9 | 12 | 20 |
| 9 | 537.8 | 630 | 350 | 20 | 8.9 | 12 | 20 |
| 10 | 537.8 | 580 | 400 | 20 | 8.9 | 12 | 20 |

Abbreviations:

DOW: Dowfax 2A1:

[chemical structure: biphenyl ether with $C_{12}$ substituent and two $SO_3Na$ groups]

IRA: Lumiten IRA:

[chemical structure: diester with $C_8$—O—C(=O)—CH$_2$—C(=O)—O—$C_8$ and $SO_3Na$ substituent]

BA: n-Butyl acrylate
MA: Methyl acrylate
AA: Acrylic acid

B) Gloss Film Lamination

Gloss film lamination with card (Chromoduplex card) and polypropylene (corona-pretreated) and with card and cellulose acetate film The pretreated side of the polypropylene (PP) film was coated with adhesive. After the adhesive had dried in cold air, the card was laid on and rolled down with a laboratory laminating roller. After they had been cut to size, the laminates were pressed in a roller press.

The adhesion was tested by peeling the film from the card at an angle of about 180 degrees.

Evaluation:
1=Paper or colored lining tears over entire area
2=Partial tearing of paper or lining
3=Good adhesion, with adhesive fracture of card (AC) or film (AF)
4=Weak adhesion with AC or AF
5=No adhesion to card or film In order to determine the groove stability, the laminated samples were given a groove 24 hours after the above production.

Evaluation of the Groove:
1=Groove is entirely satisfactory
2=Groove has opened slightly only at isolated points
3=Groove has opened markedly at certain points
4=Groove is completely open The same test was conducted with polyacetate film.
The results are listed in Tables 3 and 4 (inventive) and 5 and 6 (comparative).

TABLE 3

PP film was coated, Chromoduplex card laminated on

| | Adhesion after | | Groove condition after | |
|---|---|---|---|---|
| | 1 day | 1 week | 1 day | 1 week |
| 1 | 1 | 1 | 1 | 1 |
| 2 | 1 | 1 | 1 | 1 |
| 3 | 1 | 1 | 1 | 1 |
| 4 | 1 | 1 | 1 | 1 |
| 5 | 1 | 1 | 1 | 1 |

TABLE 4

Acetate film was coated, Chromoduplex card laminated on

| | Adhesion after | | Groove condition after | |
|---|---|---|---|---|
| | 1 day | 1 week | 1 day | 1 week |
| 1 | 1 | 1 | 1 | 1 |
| 2 | 1 | 1 | 1 | 1 |
| 3 | 1 | 1 | 1 | 2 |
| 4 | 1 | 1 | 1 | 1 |
| 5 | 1 | 1 | 1 | 1 |

TABLE 5

PP film was coated, Chromoduplex card laminated on

| | Adhesion after | | Groove condition after | |
|---|---|---|---|---|
| | 1 day | 1 week | 1 day | 1 week |
| 6 | 2 | 2 | 2 | 2 |
| 7 | 2 | 2 | 1 | 1 |
| 8 | 2 | 2 | 1 | 2 |
| 9 | 2 | 2 | 1 | 1 |
| 10 | 2 | 2 | 2 | 2 |

TABLE 6

Acetate film was coated, Chromoduplex card laminated on

| | Adhesion after | | Groove condition after | |
|---|---|---|---|---|
| | 1 day | 1 week | 1 day | 1 week |
| 6 | 2 | 2 | 2 | 2 |
| 7 | 2 | 2 | 1 | 1 |
| 8 | 2 | 2 | 1 | 2 |
| 9 | 2 | 2 | 1 | 1 |
| 10 | 2 | 2 | 2 | 2 |

We claim:

1. A process for gloss film lamination, comprising:
   i) applying an adhesive to at least one surface of a transparent polymer film or a paper or cardboard substrate to form an applied adhesive on a coated surface;
   ii) drying said applied adhesive to remove water therefrom; and
   iii) laminating said transparent polymer film bonded to said paper or cardboard substrate to produce a laminate comprising said transparent polymer film bonded to at least one of said paper or cardboard substrate;
   wherein said adhesive comprises an aqueous dispersion of a polymer formed from free-radically polymerizable monomers, wherein said polymer is comprised of monomer units
      a) from 20–99.9% by weight of a principal monomer, wherein said principal monomer is a $C_1$–$C_{20}$-alkyl (meth) acrylate selected from the group consisting of methyl methacrylate, methyl acrylate, n-butyl acrylate, 2-ethylhexyl acrylate, n-hexyl acrylate, n-octyl acrylate, and mixtures thereof; and
      b) from 0.1 to 20% by weight of an ethylenically unsaturated acid at least 20 mol% whose acid groups are present in the form of a salt of at least divalent metal.

2. The process as claimed in claim 1, further comprising from 0 to 70% by weight of at least one further monomer.

3. The process as claimed in claim 2, wherein said further monomer is a monomer which in addition to a double bond carry further functional groups selected from the group consisting of isocyanate, amino, hydroxyl, amido, or glycidyl.

4. The process as claimed in claim 1, wherein at least 40 mol % of the acid groups are present in the form of the salt of at least a divalent metal.

5. The process as claimed in claim 1, wherein said divalent metal salt is selected from the group consisting of Ca, Zn and Mg.

6. The process as claimed in claim 1, wherein said divalent metal is Ca.

7. The process as claimed in claim 1, wherein the ethylenic ally unsaturated monomer is selected from the group consisting of acrylic acid, meth acrylic acid, itaconic acid, maleic acid, fumaric acid, and mixtures thereof.

8. The process as claimed in claim 1, wherein said principal monomer is n-butyl acrylate.

9. A process for gloss film lamination, comprising:
   i) applying an adhesive to at least one surface of a transparent polymer film or a paper or cardboard substrate to form an applied adhesive on a coated surface;
   ii) drying said applied adhesive to remove water therefrom; and
   iii) laminating said transparent polymer film bonded to said paper or cardboard substrate to produce a laminate comprising said transparent polymer film bonded to at least one of said paper or cardboard substrate;
   wherein said adhesive comprises an aqueous dispersion of a polymer formed from free-radically polymerizable monomers, wherein said polymer is comprised of monomer units
      a) from 20–99.9% by weight of a principal monomer wherein said principal monomer is a vinyl ester of a carboxylic acid with 1 to 20 carbon atoms selected from the group consisting of vinyl laurate, vinyl stearate, vinyl propionate, vinyl acetate, Versatic acid vinyl ester, and mitures thereof; and
      b) from 0.1 to 20% by weight of an ethylenically unsaturated acid at least 20 mol% of whose acid groups are present in the form of a salt of at least divalent metal.

10. The process as claimed in claim 9, further comprising from 0 to 70% by weight of at least one further monomer.

11. The process as claimed in claim 10, wherein said further monomer is a monomer which in addition to a double bond carry further functional groups selected from the group consisting of isocyanate, amino, hydroxyl, amido, or glycidyl.

12. The process as claimed in claim 9, wherein at least 40 mol % of the acid groups are present in the form of the salt of at least a divalent metal.

13. The process as claimed in claim 9, wherein said divalent metal salt is selected from the group consisting of Ca, Zn and Mg.

14. The process as claimed in claim 9, wherein said divalent metal is Ca.

15. The process as claimed in claim 9, wherein the ethylenically unsaturated monomer is selected from the group consisting of acrylic acid, meth acrylic acid, itaconic acid, maleic acid, fumaric acid, and mixtures thereof.

16. A process for gloss film lamination, comprising:
   i) applying an adhesive to at least one surface of a transparent polymer film or a paper or cardboard substrate to form an applied adhesive on a coated surface;
   ii) drying said applied adhesive to remove water therefrom; and
   iii) laminating said transparent polymer film bonded to said paper or cardboard substrate to produce a laminate comprising said transparent polymer film bonded to at least one of said paper or cardboard substrate;
   wherein said adhesive comprises an aqueous dispersion of a polymer formed from free-radically polymerizable monomers, wherein said polymer is comprised of monomer units
      a) from 20–99.9% by weight of a principal monomer wherein said principal monomer is a vinyl aromatic compound having up to 20 carbon atoms which is selected from the group consisting of styrene, vinyl toluene, α-methyl styrene, β-methyl styrene, α-butyl styrene, 4-n-butyl styrene, 4-n-decyl styrene, and mixtures thereof; and
      b) from 0.1 to 20% by weight of an ethylenically unsaturated acid at least 20 mol% of whose acid groups are present in the form of a salt of at least divalent metal.

17. The process as claimed in claim 16, further comprising from 0 to 70% by weight of at least one further monomer.

18. The process as claimed in claim 17, wherein said further monomer is a monomer which in addition to a double bond carry further functional groups selected from the group consisting of isocyanate, amino, hydroxyl, amido, or glycidyl.

19. The process as claimed in claim 16, wherein at least 40 mol % of the acid groups are present in the form of the salt of at least a divalent metal.

20. The process as claimed in claim 16, wherein said divalent metal salt is selected from the group consisting of Ca, Zn and Mg.

21. The process as claimed in claim 16, wherein said divalent metal is Ca.

22. The process as claimed in claim 16, wherein the ethylenically unsaturated monomer is selected from the group consisting of acrylic acid, meth acrylic acid, itaconic acid, maleic acid, fumaric acid, and mixtures thereof.

23. A laminate produced by the process as claimed in claim 1.

24. A laminate produced by the process as claimed in claim 9.

25. A laminate produced by the process as claimed in claim 16.

* * * * *